(12) United States Patent
Schwalme et al.

(10) Patent No.: US 11,446,879 B2
(45) Date of Patent: Sep. 20, 2022

(54) APPARATUS FOR JOINING, IN PARTICULAR LASER WELDING, TWO COMPONENTS, AND OPERATING METHOD FOR SUCH A JOINING APPARATUS

(71) Applicant: LPKF Laser & Electronics AG, Garbsen (DE)

(72) Inventors: Michael Jonathan Schwalme, Fürth (DE); Nasir Fitil, Uttenreuth (DE); Tobias Jaus, Nuremberg (DE); Manuel Sieben, Fürth-Vach (DE)

(73) Assignee: LPKF Laser & Electronics AG, Garbsen (DE)

( * ) Notice: Subject to any disclaimer, the term of this patent is extended or adjusted under 35 U.S.C. 154(b) by 6 days.

(21) Appl. No.: 16/965,439

(22) PCT Filed: Jan. 9, 2019

(86) PCT No.: PCT/EP2019/050371
§ 371 (c)(1),
(2) Date: Jul. 28, 2020

(87) PCT Pub. No.: WO2019/149480
PCT Pub. Date: Aug. 8, 2019

(65) Prior Publication Data
US 2021/0053296 A1    Feb. 25, 2021

(30) Foreign Application Priority Data

Jan. 30, 2018   (DE) .................... 10 2018 201 416.7

(51) Int. Cl.
*B29C 65/16*    (2006.01)
*B29C 65/78*    (2006.01)
(Continued)

(52) U.S. Cl.
CPC .......... *B29C 65/16* (2013.01); *B29C 65/7841* (2013.01); *B29C 65/7847* (2013.01);
(Continued)

(58) Field of Classification Search
CPC .......... B29C 66/1312; B29C 66/81463; B29C 66/8246; B29C 66/92451; B29C 66/9261;
(Continued)

(56) References Cited

U.S. PATENT DOCUMENTS 5,597,440 A    1/1997   Pecha
9,180,612 B2   11/2015  Kerbiguet et al.

FOREIGN PATENT DOCUMENTS

DE              19924469 A1    11/2000
DE          102013220497 A1     4/2015
(Continued)

*Primary Examiner* — Daniel McNally
(74) *Attorney, Agent, or Firm* — Browdy and Neimark, PLLC (57) ABSTRACT

An apparatus for joining, in particular laser welding, two components, in particular plastics components, comprises—two workpiece receptacles (1, 3) for respectively holding the two components (2, 4) to be connected, —in each case one bearing element, preferably a bearing plate (7), for each of the workpiece receptacles (1, 3), —a clamping drive (SA) for at least one bearing element for feeding and bracing of the two components (2, 4) held in the workpiece receptacles (1, 3) during the joining process, —a controller (9) for the clamping drive (SA) and in particular a laser welding device (LS), and—a mechanically loose coupling between the clamping drive (SA) and bearing element (7) such that the two workpiece receptacles (1, 3) are tiltable towards one another during feeding and bracing. Also disclosed is a method for operating such a joining apparatus during a
(Continued)

joining process of two components (2, 4) held in the workpiece receptacles (1, 3), in particular during a laser welding process.

17 Claims, 5 Drawing Sheets

(51) Int. Cl.
*B29C 65/00* (2006.01)
*B29L 31/30* (2006.01)
*B29L 31/00* (2006.01)

(52) U.S. Cl.
CPC .... *B29C 66/1312* (2013.01); *B29C 66/81463* (2013.01); *B29C 66/8246* (2013.01); *B29C 66/9261* (2013.01); *B29C 66/92451* (2013.01); *B29C 66/92921* (2013.01); *B29L 2031/30* (2013.01); *B29L 2031/747* (2013.01)

(58) Field of Classification Search
CPC .......... B29C 66/92921; B29C 66/9221; B29C 66/9241; B29C 65/16; B29C 65/7841; B29C 65/7847
See application file for complete search history.

(56) References Cited

FOREIGN PATENT DOCUMENTS

| | | | | |
|---|---|---|---|---|
| DE | 102014212837 A1 | 1/2016 | | |
| EP | 1306196 A1 * | 5/2003 | ......... | B29C 65/1654 |
| EP | 1306196 A1 | 5/2003 | | |
| EP | 2566684 A1 | 3/2013 | | |
| EP | 3205481 A1 | 8/2017 | | |

\* cited by examiner

APPARATUS FOR JOINING, IN PARTICULAR LASER WELDING, TWO COMPONENTS, AND OPERATING METHOD FOR SUCH A JOINING APPARATUS

This application claims the priority of German Patent Application Serial No. DE 10 2018 201 416.7, filed on Jan. 30, 2018, pursuant to 35 U.S.C. 119(a)-(d), the content of which is incorporated herein by reference in its entirety.

FIELD OF THE INVENTION

The invention relates to an apparatus for joining, in particular for laser welding, two components, in particular plastic components, comprising two workpiece holders for respectively holding the two components to be connected, respectively a bearing element, preferably a bearing plate, for each of the workpiece holders, a clamping drive for at least one bearing element for feeding and bracing the two components held in the workpiece holders during the joining process, and a controller for the clamping drive and in particular a laser welding device, and to an operating method for such a joining apparatus.

BACKGROUND OF THE INVENTION

In conventional joining apparatuses, such as are disclosed for example in DE 199 24 469 A1, two workpiece holders are provided for respectively holding the two components to be joined. Each of these workpiece holders is seated on a corresponding bearing plate, one of which is acted on by a corresponding linear clamping drive for feeding and bracing the two components to be joined during the joining process. A controller (not explicitly disclosed) controls the clamping drive and the laser device in this laser welding system. The particular feature of this joining apparatus is that uneven workpieces are clamped by a resilient clamping surface, so that a certain tolerance compensation can take place.

EP 2 566 684 B1 discloses an apparatus for the laser-transparent welding of two components and a corresponding mounting method, two different clamping means having a plurality of mobile members being provided. One clamping means are intended to ensure geometrical referencing of the two parts on a carrier, while the second clamping means can be regulated in its force for bracing the two components.

EP 3 205 481 A1 discloses a method and an apparatus for connecting a lens and a lamp housing of a vehicle lamp by means of laser welding, in which the lamp housing is held firmly in a workpiece holder at a stationary zero point and mounted in a floating fashion on at least one holding point at a distance therefrom. The multipiece workpiece holder is therefore very complexly designed.

In the aforementioned known apparatuses and mounting methods, although the corresponding constituent parts are intended to be able to compensate for certain geometrical deviations and to be able to also clamp components having relatively complex geometries sufficiently reliably. This is however achieved with sometimes very complex designs which are relatively elaborate to implement in practice.

During the joining of components, and in particular during laser welding, there is in principle the need to be able to compensate as optimally as possible for relevant tolerances, such as are caused by the components themselves, their positioning in mutual abutment and inside the joining system. In conventional systems and methods, in which a single centrally placed drive is generally used for the feed movements of the tool clamp, although the clamping force may be varied during welding, such as for example during vibration welding, more extensive concepts for tolerance compensation not however yet been produced. In particular, it is not possible to influence the geometrical accuracy of the overall welded component, since the workpiece holder acted on by the clamping drive is always displaced parallel to the other workpiece holder.

SUMMARY OF THE INVENTION

The invention solves the aforementioned problem in terms of an apparatus for joining, in particular laser welding, two components, in particular plastic components, comprising
  two workpiece holders for respectively holding the two components to be connected,
  respectively a bearing element, preferably a bearing plate, for each of the workpiece holders,
  a clamping drive for at least one bearing element for feeding and bracing the two components held in the workpiece holders during the joining process, and
  a controller for the clamping drive and in particular a laser welding device,
comprising
  a mechanically loose coupling between the clamping drive and the bearing element, such that the two workpiece holders can be tilted with respect to one another during the feeding and bracing.

The invention solves the aforementioned problem further in terms of a method for operating a joining apparatus according to the invention during a process of joining two components held in the workpiece holders, in particular during a laser welding process, comprising the following method steps:
  feeding at least one of the bearing elements with the aid of the linear drive elements until contact of the two components to be joined, according to a predefined system setpoint value, in particular a clamping force setpoint value of at least one of the linear drive elements, the workpiece holders being adjusted into a corresponding position with respect to one another,
  establishing the contact position as a reference position,
  during the joining process, in particular welding process, further driving of the linear drive elements starting from the reference position according to at least one predefined system parameter, in particular according to a predefined clamping force and/or a predefined joining displacement of the linear drive.

The basic apparatus concept accordingly provides a mechanically loose coupling between the clamping drive and the bearing element for the workpiece holder, such that the two workpiece holders can be tilted with respect to one another during the feeding and bracing.

This additional degree of freedom in the component holding provides the possibility of improved position adjustment of the two components for their joining, which improves the dimensional accuracy and correspondingly reduces the reject rates while achieving a significant cost advantage. Furthermore, a larger process window may be achieved during the welding because of this additional tolerance compensation, which likewise reduces the reject rates.

Preferably, the coupling between the clamping drive and the bearing element for the workpiece holder is a floating bearing, which may for example be achieved particularly simply if the clamping drive engages with its individual drive elements from below vertically upwards on the bearing element and the latter rests substantially loosely—for example by means of corresponding spherical cap-shaped bearing cups—on the drive elements.

According to another preferred embodiment, the clamping drive comprises a multiplicity of linear drive elements arranged and acting parallel in the feed direction, in particular linear servo drives, on which the bearing element, configured as a bearing plate, of one workpiece holder is mounted in a floating fashion.

Thus, for example, 4 or 8 individually drivable servo drives may be used, on which the bearing plate with the lower workpiece holder is mounted in a floating fashion.

The linear drive elements may comprise position acquisition and/or drive force detection. This allows corresponding driving of the drive elements, so that it is possible to carry out systematic tilting of the bearing plate carrying the one workpiece holder and accurate and individual control of the feed movement of the individual drive elements for optimal tolerance compensation.

The invention also relates to a method for operating such a joining apparatus and comprises the following method steps:
  feeding at least one of the bearing elements with the aid of the linear drive elements until contact of the two components to be joined, according to a predefined system setpoint value, in particular a clamping force setpoint value of at least one of the linear drive elements, the workpiece holders being adjusted into a corresponding position with respect to one another,
  establishing the contact position as a reference position,
  during the joining process, in particular welding process, further driving of the linear drive elements starting from the reference position according to at least one predefined system parameter, in particular according to a predefined clamping force and/or a predefined joining displacement of the linear drive elements, until reaching a target criterion for the system parameter, and
  ending the joining process after reaching the target criterion.

These control measures use the apparatus according to the invention in order to achieve the advantages discussed at length, which need not be repeated here.

Preferred refinements of the method according to the invention provide different system setpoint values as control parameters, such as for example predefined clamping force setpoint values of the drive elements for establishing the reference position of the bearing element carrying out the feed movement, which are equal but which may also be established on the basis of different setpoint values—optionally also combined in groups of drive elements.

During the joining process, in which feeding of the bearing element with the mobile workpiece clamp takes place in the direction of the fixed workpiece clamp, various control routines may be applied separately or while being matched to one another, for better understanding of which reference is made to the description of the corresponding exemplary embodiments.

Briefly outlined, the linear drive elements may for example be regulated individually by the controller to a predefined clamping force. This predefined clamping force of the individual linear drive elements may then furthermore be adjusted in such a way that all linear drive elements simultaneously reach an individual switch-off criterion applying to them, i.e. for example a particular setting or joining movement. Thus, if one clamping drive has a greater joining displacement to travel because of the established dimensional tolerances than another clamping drive, thus these two clamping drives then operate with such different clamping forces that they travel the different joining displacements in the same time.

As an alternative to the regulating strategies above, in the manner of a master-slave controller, during the joining process, the linear drive element applying the highest clamping force may also specified, with its feed or joining displacement, the joining displacement of the further linear drive elements directly or by means of a setpoint variation as a command variable A further possibility for driving of the linear drive elements may consist in, starting from the reference position, having the geometrical data, available in the controller, of the object to be produced from the components to be joined influence the feed movement of the workpiece holder. It is therefore then possible to move the clamping drives from a starting position to its respective reference positions, and to determine the joining displacement to be traveled starting from this by each actuating drive by forming the difference from the setpoint end dimension of the workpiece by the controller, and the respective clamping forces of the actuating drives are then adjusted according to a desired regulating strategy—for example, as explained above, that the joining displacements of the individual actuating drives are travelled in the same time.

Further preferred embodiments of the method according to the invention relates to the target criterion for ending the feeding of the components by the linear drive elements. Thus, the reaching of a predefined feed displacement or of a defined limiting force, which is higher than the clamping force during the feed process, may be used for this. The latter so to speak represents feeding of the workpiece holder "until it stops" on the fixed workpiece holder.

Further features, details and advantages of the invention are found from the following description of an exemplary embodiment with the aid of the appended drawings.

DESCRIPTION OF THE PREFERRED EMBODIMENT

Figure 1:
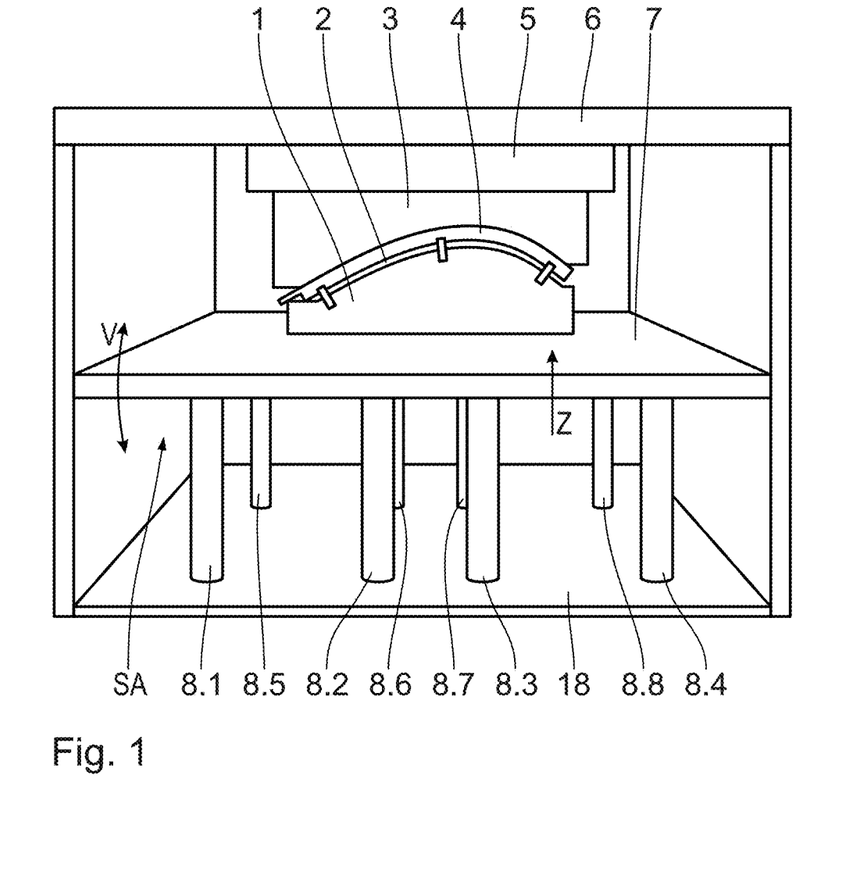
FIG. 1 shows a schematic perspective representation of a laser welding system.
Figure 2:
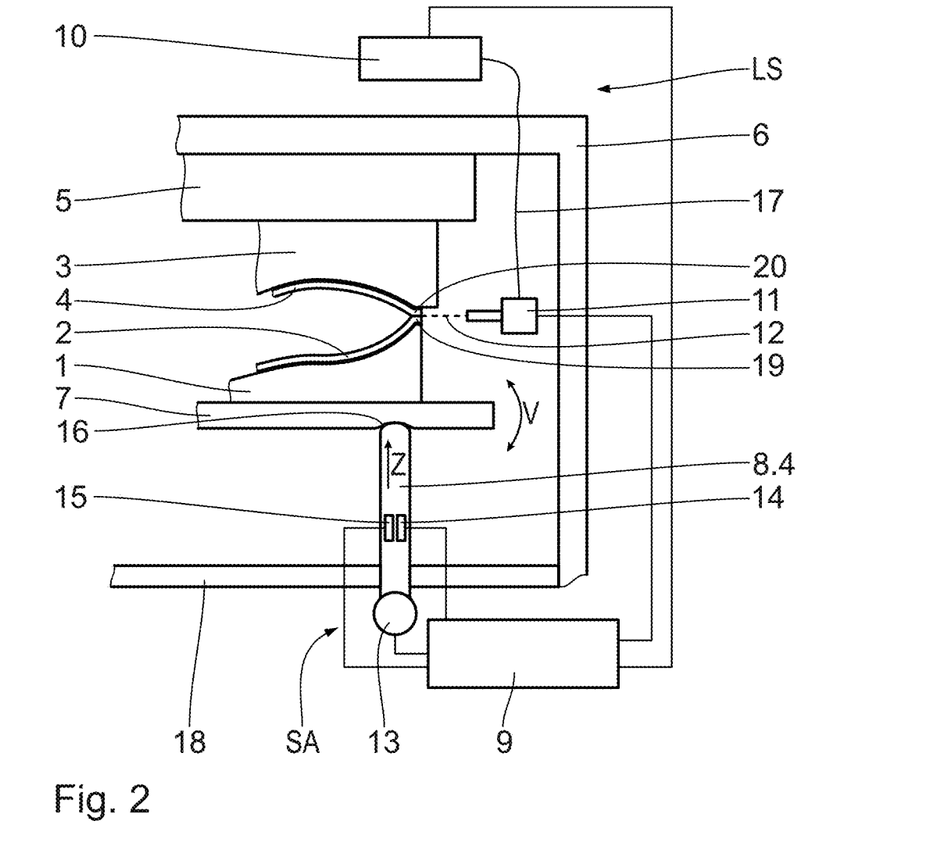
FIG. 2 shows a very highly schematic partial sectional representation of the laser welding system.

As may be seen from FIGS. 1 and 2, an exemplary joining apparatus is configured as a laser welding system in which a lower workpiece holder 1 receives a first component 2, for example a lamp housing of a motor vehicle tail lamp, and an upper workpiece holder 3 receives a second component 4, for example the lens of the tail lamp, which covers the lamp housing, for the welding process. The upper workpiece holder 3 is positioned in a fixed location by means of a base 5 on a stationary bridge 6, the second component 4 being, for example, fixed in the workshop holder 3 by applying a vacuum.

The lower workpiece holder 1 is arranged on a bearing element in the form of a substantially horizontally arranged bearing plate 7 which is movably driven by a clamping drive, denoted as a whole by SA, in the vertical feed direction Z in order to carry out feeding of the second component 4 to the first component 2 and bracing of these two components 2, 4. The clamping drive SA consists of eight vertically directed linear drive elements in the form of linear servo drives 8.1 to 8.8, which are positioned in two groups of four arranged in a rectangle in a bottom plate 18.

As revealed by FIG. 2, the laser welding system comprises a central controller 9 which, besides the clamping drive SA, also controls a schematically indicated laser welding device LS having a laser source 10, imaging optics 11 and a light guide 17 between them for the laser beam 12 carrying out the welding of the two components 2, 4.

The linear servo drives 8.1 to 8.8—of which only the one linear servo drive 8.4 is shown in FIG. 2—are respectively connected by their spindle motors 13 to the controller 9. The linear servo drives furthermore respectively comprise a detector 14 for recording the forward movement position and a detector 15 for recording the clamping force of the respective linear servo drive 8.1 to 8.8. These detectors 14, 15 deliver their recorded values to the controller 9.

As is furthermore schematically indicated in FIG. 2, the bearing plate 7 rests loosely on the round heads of the linear servo drives 8.1 to 8.8 by means of a spherical cap-shaped indentation 16, so that a floating bearing of the bearing plate 7 on the linear servo drives 8.1 to 8.8 is obtained overall, which allows tilting of the bearing plate 7 and therefore of the workpiece holders 1, 3 relative to one another as indicated by the arrow V.

Figure 3:
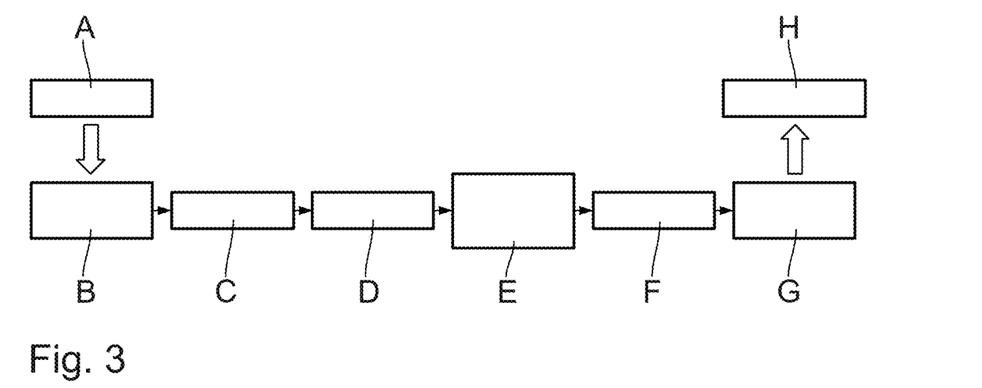
FIG. 3 shows a flowchart for a welding process carried out on this laser welding system.

The basic method sequence of the clamping and welding process should now be explained with the aid of FIG. 3. It is not represented in the drawings that the clamping drive SA is initially moved downward. The system is therefore opened and the components 2, 4 are placed in the lower workpiece holder 1—step A.

The controller 9 then activates the clamping drive SA and moves the linear servo drives 8.1 to 8.8 uniformly upward. The components 2, 4 are thereby brought into the working position—step B.

At the end of this step B, the determination of a reference position is carried out—step C—by feeding the lower workpiece holder 1 with the two components 2, 4 into contact against the upper workpiece holder 3. The clamping force applied in this case is recorded for each clamping drive by the respective clamping force detector 15 and compared by the controller 9 with a predefined system setpoint value, for example 2 kN. As soon as this value is reached, the position of the corresponding linear servo drive 8.1 to 8.8 is zeroed and this contact position is established as a reference position for measuring the further setting displacement between the two workpiece holders 1, 3 and the corresponding two components 2, during the laser welding.

The welding process is then carried out—step D—, during which the two components 2, 4 are welded together in the conventional way in the region of their welding flange 19, 20 together by applying the laser beam 12 to them. As will be explained in more detail below with the aid of FIGS. 4 to 9, operation may in this case be carried out with various regulating strategies, until a corresponding target criterion is reached and the welding process is therefore ended by switching off the laser beam 12—step E.

The workpiece joined from the two components 2, 4 is subsequently still kept under pressure in a defined way until the plastic cools, particularly in the region of the melted weld seam, and a permanent connection is produced between the two components 2, 4—step F.

In order to remove the workpiece, the bearing plate 7 with the workpiece holder 1 and the complete workpiece is moved downward into the bottom position with the aid of the clamping drive SA—step G—and the workpiece can be removed—step H.

Figure 4:
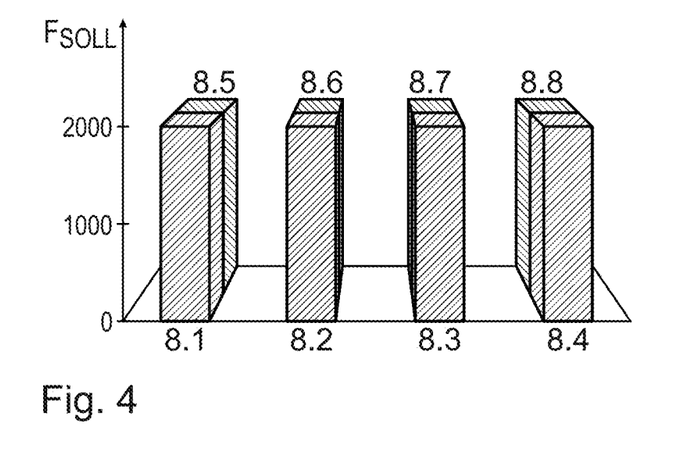
FIG. 4 shows a chart of the clamping forces of the individual linear drive elements of the laser welding system.
Figure 5:
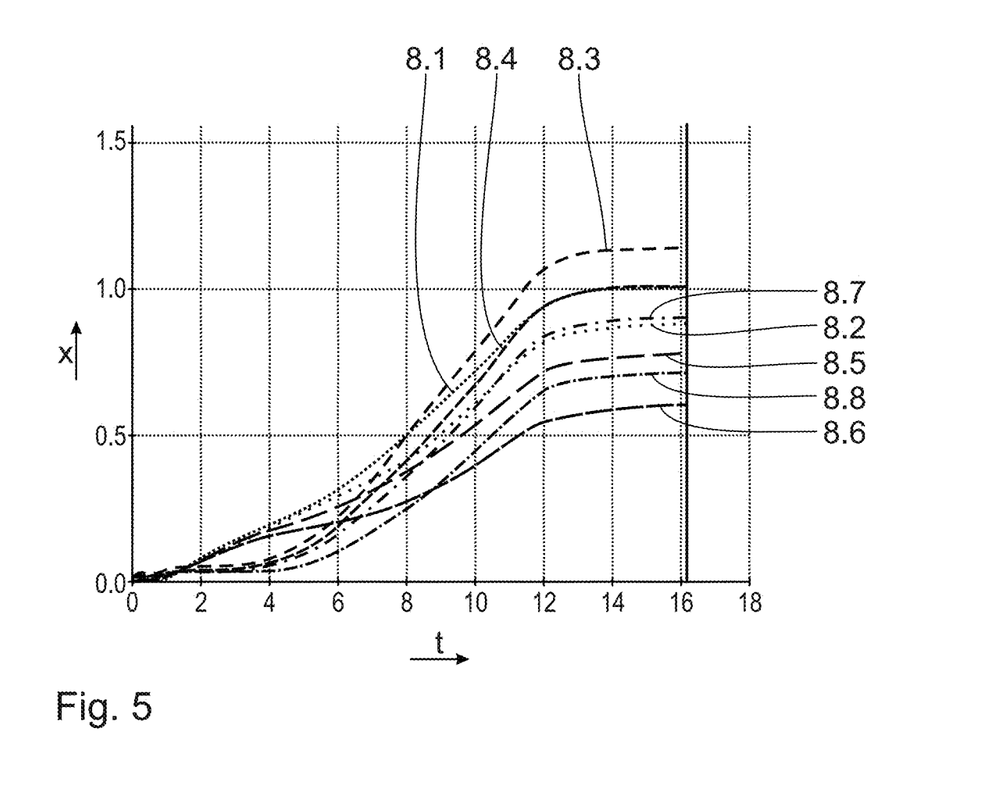
FIG. 5 shows a time/feed displacement diagram of these linear drive elements.

The aforementioned regulating strategies will now be discussed in more detail below. Thus, FIG. 4 shows the adjustment of the clamping force setpoint values $F_{SETPOINT}$ of the eight linear servo drives 8.1 to 8.8 to a common equal value of 2 kN. Each linear servo drive is in this case thus driven in steps B and C until the reaching of this setpoint value is recorded by means of its clamping force detector 15. In practice, this means that in the event of tolerances, for example in the region of the interfaces between the two components 2, 4, the linear servo drives 8.1 to 8.8 find their zero point individually and are correspondingly moved into slightly different height positions as the respective reference position.

Starting from this position, in a first alternative, during the welding process—step D—the linear servo drives 8.1 to 8.8 can be driven individually during the further forward movement with a predefined clamping force of for example 2 kN. Although this leads to a very homogeneous force profile during the welding process, as may be seen from FIG. 5, the feed displacement x
(=setting displacement of the two components 2, 4 respective to one another) achieved in this case may vary greatly however from drive to drive because of the melting process between the two components 2, 4. For example, the reaching of a setpoint setting displacement of all drives of 0.5 mm may be defined as a switch-off criterion for ending the welding process.

Figure 6:
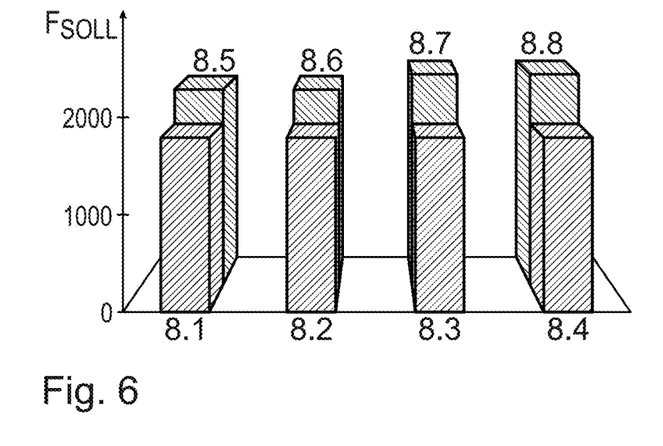
FIGS. 6 and 7 show representations similar to FIGS. 4 and 5 with clamping forces of the linear drive elements differing from one another.
Figure 7:
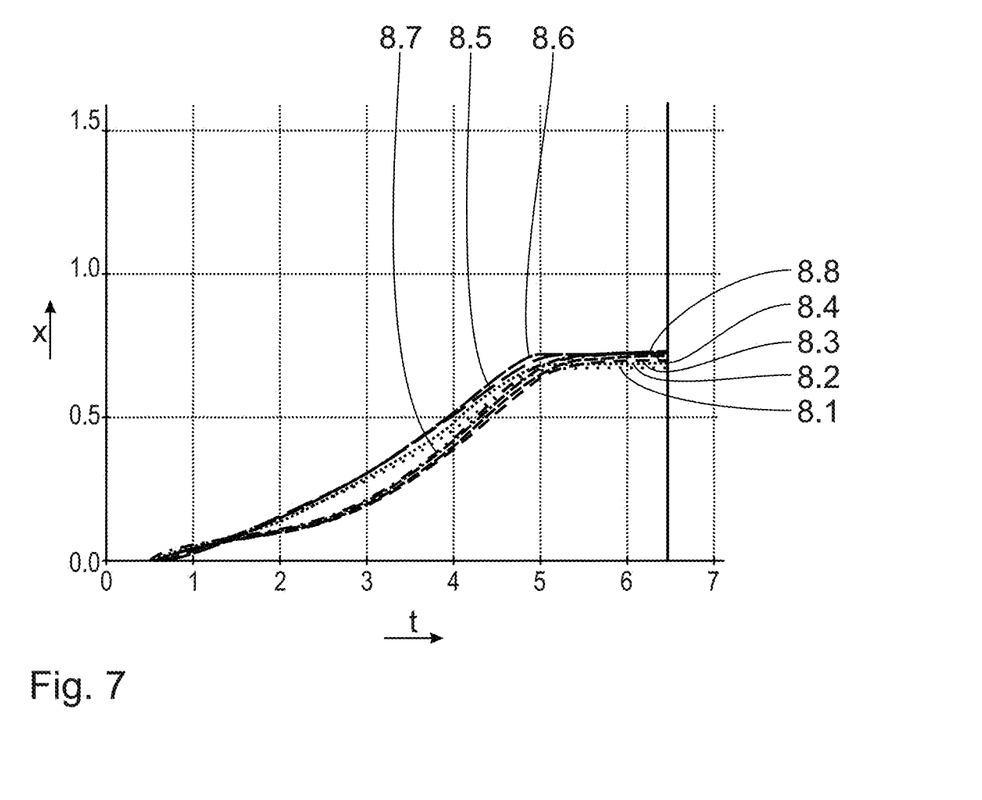

In the alternative shown in FIGS. 6 and 7 of the control of the welding process, for step C different clamping force setpoint values $F_{SETPOINT}$ are predefined for the various linear actuating drives 8.1 to 8.8. Thus, matching values of 1.8 kN are defined for the linear drives 8.1 to 8.4, while about 2.3 kN to 2.5 kN are applied to the linear drives 8.5 to 8.8 arranged in the rear row in order to establish the reference position. The starting positions of the individual linear servo drives may therefore deviate even more significantly than in the previous exemplary embodiment. As may be seen clearly from FIG. 7, however, during the subsequent welding, while regulating the linear servo drives 8.1 to 8.8 to a defined setpoint clamping force, a substantially more homogeneous profile of the feed displacement x is achieved. This significantly improves the dimensional accuracy of the workpiece produced from the components 2, 4.

Figure 8:
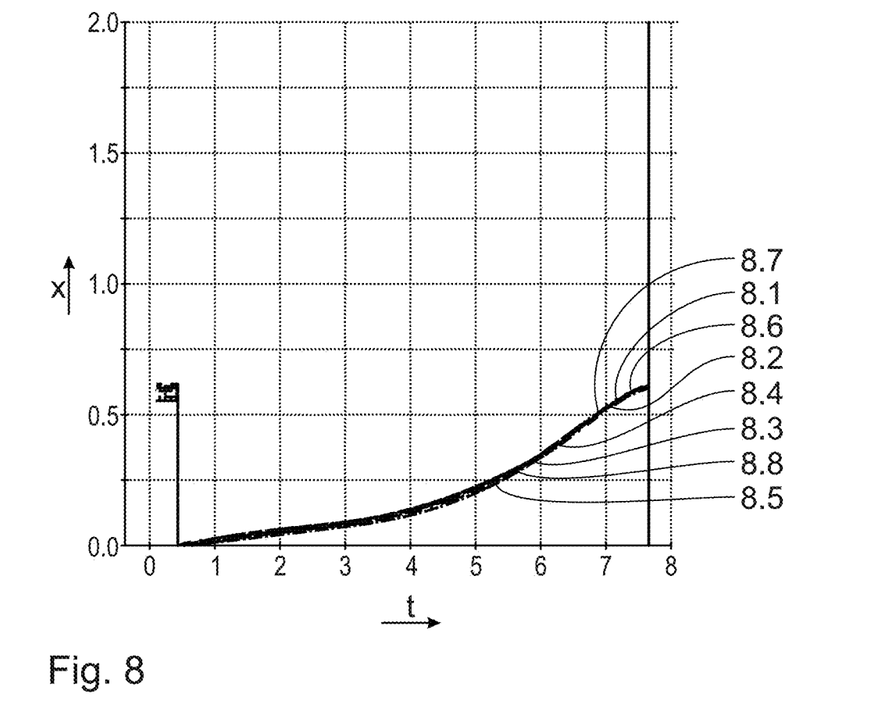
FIGS. 8 and 9 show time/feed displacement diagrams of further alternative drivings of the linear drive elements.

In the regulating strategy explained with the aid of FIG. 8 for the welding process, in a similar way to the previous procedure, it is again assumed that the zero point of the individual linear servo drives and correspondingly the reference position for the welding process is again adjusted by means of the reaching of a defined setpoint clamping force. Then, however, for the welding process the linear servo drives are coupled in terms of control technology so that the drive for which the highest counterforce is determined with the aid of the clamping force detector 15 is used as a leading axis, which specifies the feed displacement x for all linear servo drives 8.1 to 8.8. Correspondingly, in FIG. 8 their feed displacements correspond to one another within the system tolerances. Naturally, the feed process and therefore the setting displacement achieved are very homogeneous, which in turn favors the dimensional accuracy of the workpiece. However, this leads to clamping forces that vary during the welding process. Again, the reaching of a setpoint feed displacement of for example 0.5 mm is established as a switch-off criterion for the welding process.

Figure 9:
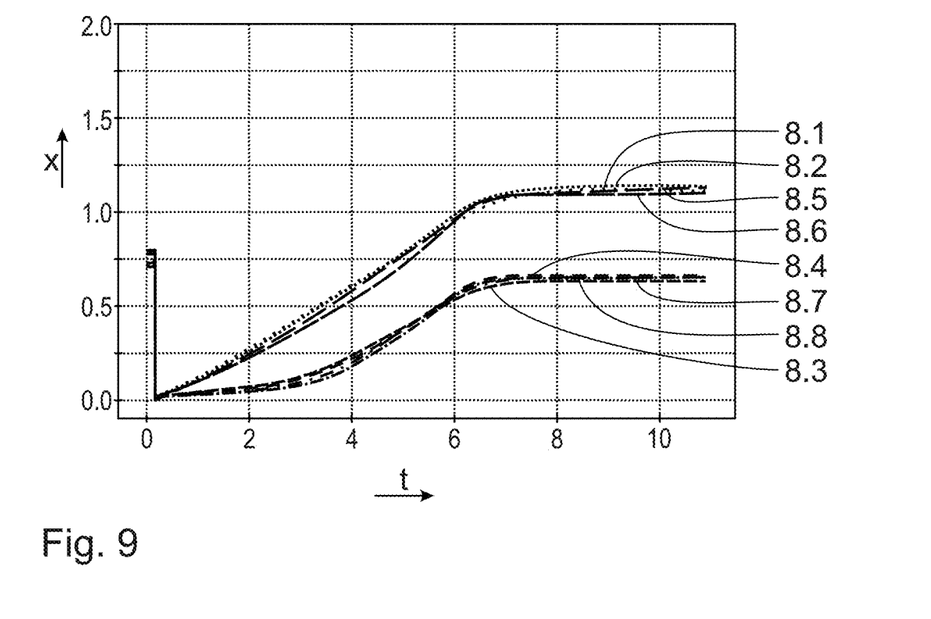

With the aid of FIG. 9, a variant of the regulating strategy according to FIG. 8 will be explained. Here, although the linear servo drive applying the highest clamping force is again used as a leading axis, this however specifies a matching setting or feed displacement only for one group of linear servo drives (lower graph in FIG. 9). A second group of linear servo drives is controlled in such a way that they travel a significantly greater feed displacement (upper graph in FIG. 9). Tolerances can therefore be compensated for even better. In particular, dimensional accuracy of the overall component may be ensured even in the event of dimensional deviations of the individual components 2, 4. The reaching of an individual setpoint setting displacement may be the switch-off criterion in this case.

Lastly, variants (not graphically represented) for regulating strategies during the welding, in which the reference position is again defined as in the exemplary embodiments above, are also to be added.

In one variant, dimensional accuracy of the individual components may be ensured by an individual setting displacement adjustment, the actual dimensioning of the component being determined by means of the reference position and the setpoint dimensioning being known from the CAD data of the component. By comparing the actual and setpoint dimensioning, a locally required feed displacement may be calculated by the controller 9 and corresponding driving of the individual linear servo drives 8.1 to 8.8 may be carried out individually. Selection criteria may in this case again be that each linear servo drive has reached its individual setpoint setting displacement, in which case the clamping force, determining its forward movement speed, of the individual linear servo drives 8.1 to 8.8 may be adjusted according to the setpoint setting displacement of the individual drives, in such a way that the setpoint setting displacements are travelling at the same time and the melting of the components 2, 4 ends simultaneously at all points of the weld seam.

In another variant, operation may be carried out according to the manner of butt welding, by each linear servo drive being force-regulated individually. If a predefined setpoint clamping force is measured as exceeded with the aid of the respective clamping force detector 15 on a respective linear servo drive, it is deduced from this that the workpiece holders 1, 3 have been moved "to the end" in the region of this linear servo drive, so that the linear servo drive is switched off.

The invention claimed is:

1. An apparatus for joining two components, comprising:
two workpiece holders for respectively holding the two components to be connected,
respectively a bearing element for each of the workpiece holders,
a clamping drive for at least one bearing element for feeding and bracing the two components held in the workpiece holders during the joining process,
a controller for the clamping drive and a laser welding device, and
a mechanically loose coupling between the clamping drive and the bearing element, such that the two workpiece holders can be tilted with respect to one another during the feeding and bracing,
wherein the coupling between the clamping drive and the bearing element is a floating bearing.

2. The apparatus as claimed in claim 1 for laser-welding two plastic components.

3. An apparatus for joining two components, comprising:
two workpiece holders for respectively holding the two components to be connected,
respectively a bearing element for each of the workpiece holders,
a clamping drive for at least one bearing element for feeding and bracing the two components held in the workpiece holders during the joining process,
a controller for the clamping drive and a laser welding device, and
a mechanically loose coupling between the clamping drive and the bearing element, such that the two workpiece holders can be tilted with respect to one another during the feeding and bracing,
wherein the clamping drive comprises a plurality of linear drive elements arranged and acting parallel in a feed direction, on which the bearing element, configured as a bearing plate, of one workpiece holder is mounted in a floating fashion.

4. The apparatus as claimed in claim 3, wherein the linear drive elements comprise at least one of the group consisting of position acquisition and drive force detection.

5. The apparatus as claimed in claim 4, wherein the linear drive elements can be driven individually by the controller according to values recorded by at least one of the group consisting of the position acquisition and the drive force detection.

6. The apparatus as claimed in claim 3, wherein the linear drive elements are linear servo drives.

7. A method for operating a joining apparatus in which a clamping drive comprises a plurality of linear drive elements arranged and acting parallel in a feed direction, on which bearing elements, configured as a bearing plate, of workpiece holders are mounted in a floating fashion,
during a process of joining two components held in the workpiece holders, comprising the following method steps:
feeding at least one of the bearing elements with the aid of the linear drive elements until contact of the two components to be joined, according to a predefined system setpoint value the workpiece holders being adjusted into a corresponding position with respect to one another,
establishing the contact position as a reference position, during the joining process further driving of the linear drive elements starting from the reference position according to at least one predefined system parameter until reaching a target criterion for the system parameter, and
ending the joining process after reaching the target criterion.

8. The method as claimed in claim 7, wherein the linear drive elements are regulated individually by a controller to a predefined clamping force during the joining process.

9. The method as claimed in claim 8, wherein the predefined clamping force of the individual linear drive elements is adjusted in such a way that all linear drive elements simultaneously reach an individual switch-off criterion applying to them.

10. The method as claimed in claim 7, wherein the predefined system setpoint value is a clamping force setpoint value of at least one of the linear drive elements.

11. The method as claimed in claim 7, wherein the at least one predefined system parameter is at least one of the group consisting of a predefined clamping force and a predefined joining displacement of the linear drive elements.

12. The method as claimed in claim 7, wherein for each linear drive element, same or different predefined clamping force setpoint values are used as a system setpoint value for establishing the reference position.

13. The method as claimed in claim 7, wherein during the joining process, the linear drive element applying a highest clamping force specifies, with a joining displacement, the joining displacement of the further linear drive elements one of the group consisting of directly and by a setpoint variation as a command variable.

14. The method as claimed in claim 7, wherein during the joining process, the driving of the linear drive elements starting from a reference position is carried out according to geometrical data, available in a controller, of an object to be produced from the components to be joined.

15. The method as claimed in claim 7, wherein a target criterion for ending the feeding of the components by the linear drive elements is the reaching of a predefined feed displacement.

16. The method as claimed in claim 7, wherein a target criterion for ending the feeding of the components by the linear drive elements is the reaching of a defined limiting force, which is higher than a clamping force during the feed process.

17. The method as claimed in claim 7, wherein the process of joining two components held in the workpiece holders is a laser welding process.

* * * * *